(12) United States Patent
Palenius et al.

(10) Patent No.: US 12,471,179 B2
(45) Date of Patent: Nov. 11, 2025

(54) METHODS FOR RESOURCE RESERVATION OF A CONTENTION-BASED SIDELINK TRANSMISSION AND RELATED WIRELESS DEVICES

(71) Applicant: Sony Group Corporation, Tokyo (JP)

(72) Inventors: Torgny Palenius, Barsebäck (SE); Nafiseh Mazloum, Lund (SE); Anders Berggren, Lund (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 339 days.

(21) Appl. No.: 18/270,516

(22) PCT Filed: Jan. 12, 2022

(86) PCT No.: PCT/EP2022/050531
§ 371 (c)(1),
(2) Date: Jun. 30, 2023

(87) PCT Pub. No.: WO2022/152744
PCT Pub. Date: Jul. 21, 2022

(65) Prior Publication Data
US 2024/0057211 A1  Feb. 15, 2024

(30) Foreign Application Priority Data
Jan. 14, 2021  (SE) .................... 2150026-9

(51) Int. Cl.
*H04W 76/28* (2018.01)
*H04W 72/02* (2009.01)
*H04W 72/25* (2023.01)

(52) U.S. Cl.
CPC .......... *H04W 76/28* (2018.02); *H04W 72/02* (2013.01); *H04W 72/25* (2023.01)

(58) Field of Classification Search
CPC ...... H04W 76/28; H04W 72/25; H04W 72/02
See application file for complete search history.

(56) References Cited

U.S. PATENT DOCUMENTS

| 2015/0326492 A1 | 11/2015 | Jeong |
| 2020/0252910 A1 | 8/2020 | Wu |

(Continued)

FOREIGN PATENT DOCUMENTS

| EP | 3614774 A | 2/2020 |

OTHER PUBLICATIONS

International Search Report from corresponding International Application No. PCT/EP2022/050531, mailed on May 13, 2022; 3 pages.

(Continued)

*Primary Examiner* — Won Tae C Kim
(74) *Attorney, Agent, or Firm* — Tucker Ellis LLP

(57) ABSTRACT

Disclosed is a method is disclosed, performed by a wireless device, for resource reservation of a contention-based sidelink transmission. The method comprises obtaining information defining a transmission resource pool and a resource reservation pool comprising one or more resource reservation blocks associated with respective transmission resources in the transmission resource pool. The one or more resource reservation blocks comprise a plurality of occasions. The method comprises transmitting a resource reservation signal using a first occasion of a resource reservation block associated with a transmission resource selected by the wireless device for sidelink transmission. The method comprises monitoring one or more other occasions of the resource reservation block for resource reservation signals transmitted by other wireless devices aiming at reserving the same transmission resource. The one or more other occasions are different from the first occasion. The method (Continued)

comprises controlling, based on the monitoring, the sidelink transmission using the transmission resource.

13 Claims, 7 Drawing Sheets

(56) References Cited

U.S. PATENT DOCUMENTS

| | | | |
|---|---|---|---|
| 2020/0344722 A1 | 10/2020 | He | |
| 2020/0359389 A1 | 11/2020 | Bharadwaj | |
| 2020/0367113 A1 | 11/2020 | Tang | |
| 2023/0063472 A1* | 3/2023 | Freda | H04W 52/0274 |
| 2023/0371050 A1* | 11/2023 | Van Phan | H04W 72/51 |

OTHER PUBLICATIONS

Office Action and Search Report from corresponding Swedish Application No. 2150026-9, mailed on Sep. 24, 2021, 9 pages.
LG Electronics, "Discussion on physical layer design considering sidelink DRX operation", 3GPP TSG RAN WG1 #103-e, R1-2007897, Oct. 26-Nov. 13, 2020, 15 pages.

* cited by examiner

METHODS FOR RESOURCE RESERVATION OF A CONTENTION-BASED SIDELINK TRANSMISSION AND RELATED WIRELESS DEVICES

The present disclosure pertains to the field of wireless communications. The present disclosure relates to a method for resource reservation of a contention-based sidelink transmission and to a wireless device.

BACKGROUND

In wireless communications systems, a wireless device, (such as user equipment, UE, for example a mobile phone or wireless modem) can communicate with other wireless devices via a network node (such as a base station, BS, such as a next generation NodeB, gNB, evolved NodeB, eNB), or directly. Direct communication with other wireless devices is referred to as device-to-device communication or sidelink communication. In sidelink communication, the wireless device communicates data directly with one or more other wireless devices within its range or vicinity.

The Third Generation Partnership Project (3GPP) has started to adopt sidelink communication, for example in Long Term Evolution, LTE, and New Radio, NR, such as for proximity-based services.

In NR, sidelink transmission, Tx, and reception, Rx, resource pools are configured either by a network node when the wireless device, WD, is in radio resource control connected, RRC_Connected, mode, or via system information block, SIB (such as SIB12) when the WD in operation is in idle mode and in-coverage. Wireless devices are typically also preconfigured (for example in factory or while still in-coverage) with special resources (preconfigured Tx/Rx pool) for use when out of coverage.

The selection of resources within the TxPool when transmitting data in the legacy sidelink is performed either by the RAN which allocates the resources where the WD is allowed to transmit, (referred to as Mode 1), or by the WD which senses the TxPool to find resources which are not used during a period in advance of the transmission, (referred to as Mode 2 e.g. in 3GPP TS 36.300 v16.2, e.g. in 3GPP TS 38.300 v16.9).

Release16 NR sidelink is designed based on the assumption that the WD is "always-on" when the WD operates sidelink. However, this may only be applicable to WDs installed in vehicles with sufficient battery capacity. There is a need for solutions for power saving. Power saving may be required by for example vulnerable road users, VRUs, in vehicle-to-everything, V2X, use cases and for WDs in public safety and commercial use cases with limited energy resources where power consumption in the WDs needs to be minimized.

SUMMARY

Discontinuous Reception, DRX, for sidelink is currently being discussed for 3GPP Release 17 but not yet implemented in the legacy sidelink communication. DRX operation introduce challenges, such as for sensing the availability of a resource. There is a need for alignment between the sensing procedure, the Tx resource selection and the transmission time of transmitting WD and DRX of receiving WD. It may be appreciated that introducing DRX presents a challenge in re-acquiring the channel when there is a need for transmission.

Accordingly, there is a need for wireless devices and methods for resource reservation of a contention-based sidelink transmission, which mitigate, alleviate or address the shortcomings existing and provide an improvement in terms of power consumption of the WDs by enhanced sensing and resource selection.

A method is disclosed, performed by a wireless device, for resource reservation of a contention-based sidelink transmission (such as with DRX operation). The method comprises obtaining information defining a transmission resource pool and a resource reservation pool comprising one or more resource reservation blocks associated with respective transmission resources in the transmission resource pool. The one or more resource reservation blocks comprise a plurality of occasions. The method comprises transmitting a resource reservation signal using a first occasion of a resource reservation block associated with a transmission resource selected by the wireless device for sidelink transmission. The method comprises monitoring one or more other occasions of the resource reservation block for resource reservation signals transmitted by other wireless devices aiming at reserving the same transmission resource. The one or more other occasions are different from the first occasion. The method comprises controlling, based on the monitoring, the sidelink transmission using the transmission resource.

Further, a wireless device is provided. The wireless device comprises memory circuitry, processor circuitry, and a wireless interface. The wireless device is configured to perform any of the methods according to the disclosure.

It is an advantage of the present disclosure that the disclosed method and the disclosed wireless device benefit from a mitigated risk of collision during sidelink transmission, such as with DRX operation. The disclosed method and the disclosed wireless device allow for an efficient sensing prior to an active transmission and an enhanced resource reservation procedure. It is to be noted that present disclosure avoids collisions in active transmission(s) which otherwise would increase the interference and may require retransmissions resulting increased power consumption. In other words, the contention is resolved during an occasion of a resource reservation block associated with a transmission resource selected by the wireless device before deciding to transmit over the selected resource. The WD transmission time is aligned with DRX active time of the receiving WDs. The disclosed technique optimizes WD sensing mechanism, which is particularly beneficial when many of the WDs in the area may use the same DRX occasions. The disclosed technique also leads to power savings for the WDs, for example due to less collisions.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
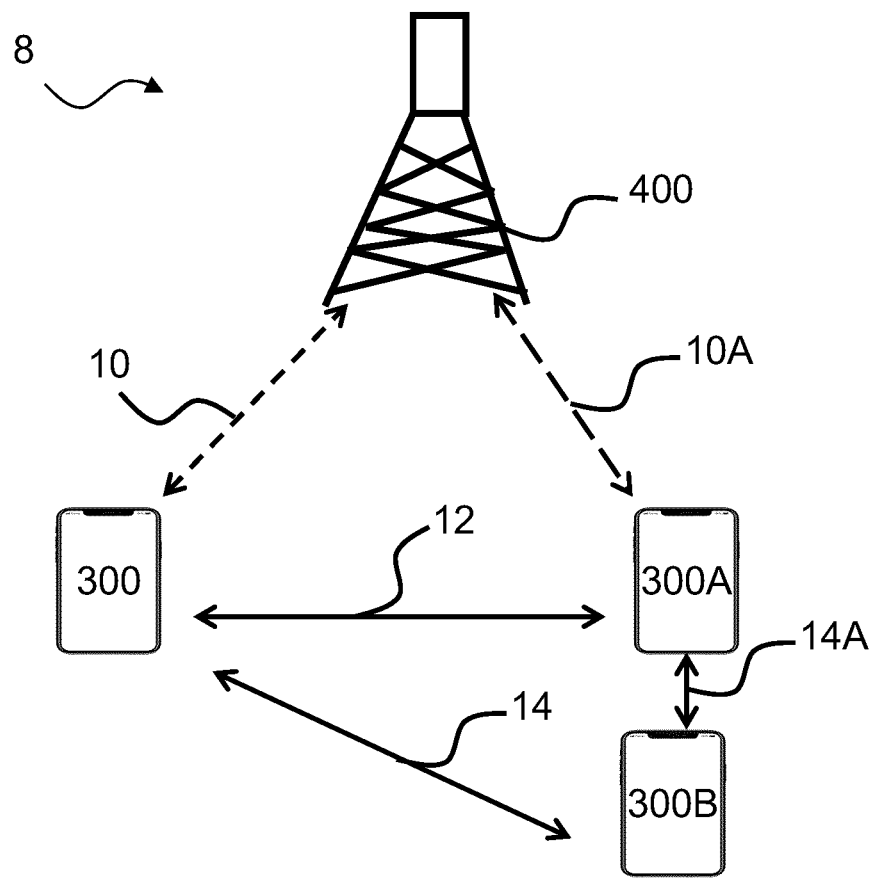
FIG. 1 is a diagram illustrating an example wireless communication system comprising an example network node and example wireless devices according to this disclosure.

Various examples and details are described hereinafter, with reference to the FIGS. when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 8 comprising an example wireless device 300 according to this disclosure.

As discussed in detail herein, the present disclosure relates to a wireless communication system 8 comprising a cellular system, for example, a 3GPP wireless communication system. The wireless communication system 8 comprises a wireless device 300 and/or a network node 400.

A network node disclosed herein refers to a radio access network node operating in the radio access network, such as a base station, an evolved Node B, eNB, gNB in NR. In one or more examples, the RAN node is a functional unit which may be distributed in several physical units.

The wireless communication system 8 described herein may comprise one or more wireless devices 300, 300A, 300B and/or one or more network nodes 400, such as one or more of: a base station, an eNB, a gNB and/or an access point.

A wireless device may refer to a mobile device and/or a user equipment, UE.

The wireless device 300, 300A may be configured to communicate with the network node 400 via a wireless link (or radio access link) 10, 10A.

The wireless devices 300, 300A may be configured to communicate with wireless device 300B using D2D communication and/or sidelink communication via their respective wireless links 14, 14A.

The wireless device 300 may be configured to communicate with wireless device 300A using D2D communication and/or sidelink communication via their respective wireless links 12.

A WD 300, 300A, 300B may be configured for sidelink communication for different purposes. Various examples for sidelink communication include communication from or to a WD associated with, such as arranged in a vehicle. The Vehicle-to-everything (V2X) communication is a communication between a vehicle and any entity that may associate, or may be associated by, the vehicle. V2X operations may be aiming at road safety, traffic efficiency, and energy savings. A vehicular communication system for V2X may include other more specific types of communication, such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). V2X is introduced in Release 16 for 3GPP specifications for wireless communication. V2X services is just one non-limiting example of sidelink communication in which the disclosed technique may be applied.

Sidelink communication may be advantageous in communication in out-of-coverage situations, for example for a wireless device which cannot directly communicate with a network node but can communicate with the network node indirectly with assistance of a relay wireless device and sidelink communication.

Sidelink communication may include transmission from one or more WDs 300, 300A, 300B, and/or reception by one or more WDs 300, 300A, 300B.

For example, the WDs 300, 300A, 300B configured for sidelink communication may sense the channel configured for sidelink communication to determine if any communication can or is taking place before a transmission by any WDs 300, 300A, 300B.

The WDs 300, 300A, 300B configured for sidelink communication may monitor the channel to check for potential data for reception.

Figure 2:
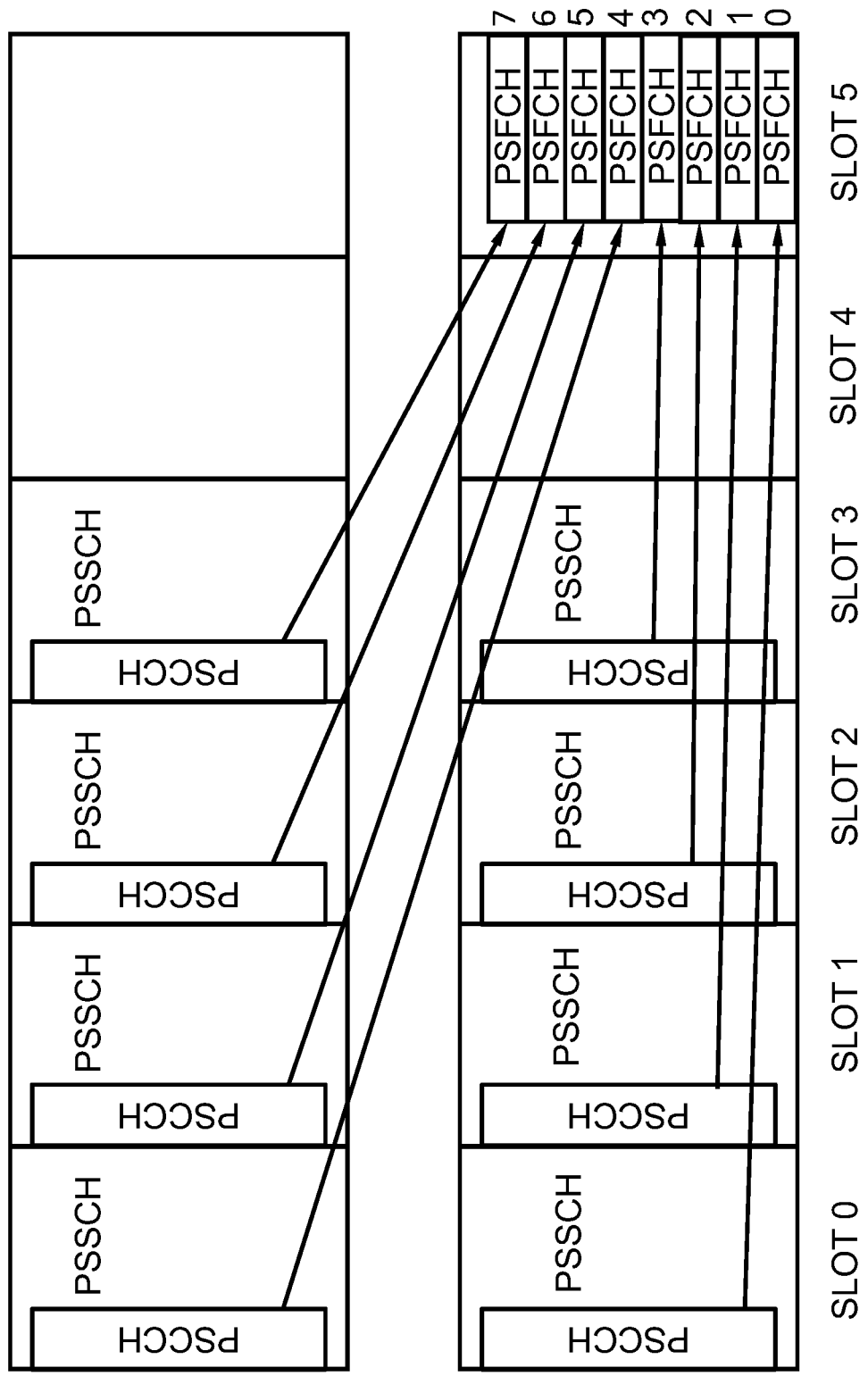
FIG. 2 is a schematic diagram of resources in a resource pool for sidelink communication according to legacy sidelink configuration.

FIG. 2 is a schematic diagram of resources in a resource pool for sidelink communication according to legacy sidelink configuration.

In sidelink, the Physical Sidelink Control Channel (PSCCH) is used by the wireless device (such as UE) to monitor for potential communication. PSCCH periodicity may be a fixed value given by the minimum delay needed in the system. For example, for traffic safety usage of vehicle to everything, V2X, a WD of a pedestrian or another Vulnerable Road User (VRU) may receive information (such as position, speed, and/or type) from vehicles when the WD of the pedestrian is close to traffic (such as at crossroads). The WD may for example receive the information mainly during rush hour, but also at other times when there may be fast moving vehicles on the same road/path as the WD. It is to be note that the constant monitoring of the sidelink resources leads to a high power consumption of the WD.

A sidelink message is sent using resources on the PSCCH and physical sidelink shared channel, PSSCH, channels. The PSCCH transmission may contain Sidelink Control Information, SCI-1, which includes a general sidelink identification, sidelink ID, indicating where the resource is allocated and used. The PSSCH transmission may contain Sidelink Control Information, SCI-2, which includes the target WD identifier, which can target a specific wireless device (such as UE, e.g. via unicast), or a group of wireless devices (such as UEs) for a specific service (e.g. via groupcast), or all available wireless devices (such as UEs, e.g. via broadcast).

FIG. 2 shows an example structure of a slot of the Rx Pool according to an example of the prior art, usable for understanding the technique disclosed herein. The slot may comprise resources for PSCCH, resources for PSSCH comprising data and $2^{nd}$ stage SCI. Furthermore, resources for a physical sidelink feedback channel (PSFCH) are provided for e.g. hybrid automatic repeat request (HARQ) purposes. A slot disclosed herein is illustrative and the present disclosure is not limited to a slot or a slot structure. The present disclosure may be applied a frame structure and/or a subframe structure, e.g. in TS 38.211, section 4.3.

For sidelink communication, the radio resource management may be performed using resource pools: a transmission resource pool, TxPool and/or a reception resource pool, RxPool. The TxPool and/the RxPool can be signaled by the network node for the in-coverage WDs, or preconfigured (such in factory or when in-coverage earlier) for the out-of-coverage WDs. A TxPool is associated with an RxPool in order to enable communication. When the WD monitors the RxPool for potential data, the WD is to monitor all slots and subchannels within the configured RxPool.

The WDs configured for sidelink communication can only transmit data using a transmission resource pool, TxPool, within a limited time duration and frequency range and with certain periodicity. All WDs with sidelink activated are listening during a resource reception pool, RxPool which includes the TxPool. This way, the WDs can hear or receive the transmissions. In other words, the RxPool may be larger than the Tx pool so that a WD can listen on wireless devices (such as UEs) using sidelink in adjacent cells as well where the TxPool may be configured with another TxPool in order to avoid interference between the cells. This way, also reception from WDs in neighboring or adjacent cells or from WDs out-of-coverage is possible.

Two modes of resource assignment may be envisaged or defined: Mode 1 and Mode 2. In Mode 1, the network node can indicate the resources to be used for transmission, including the resources within an RxPool. In Mode 2, the WD can select an RxPool and the resources of the RxPool from a set of assigned Rxpools.

The selection of resources (such as time resource, frequency resource) within the TxPool when transmitting data in the legacy sidelink can be performed in one of two ways. For example, in the legacy sidelink the radio access network, RAN allocates the resources where the wireless device (such as UE) is allowed to transmit data to another WD, referred to as Mode 1. For example, alternatively, in Mode 2, the wireless device (such as UE) is sensing the TxPool to find resources which are not used during a period in advance of the transmission.

For the in-coverage wireless device (such as UE), a network node (such as gNB) can be configured to adopt Mode 1 or Mode 2. For the out-of-coverage wireless device (such as UE), only Mode 2 can be adopted.

The channel sensing procedure in Mode 2 requires a transmitting wireless device (such as UE) to perform channel sensing to sense if any other WD is transmitting or allocating resources to be used for transmitting, and when a signal is received, to decode the signal in a randomly and/or autonomously selected resource pool.

Figure 3:
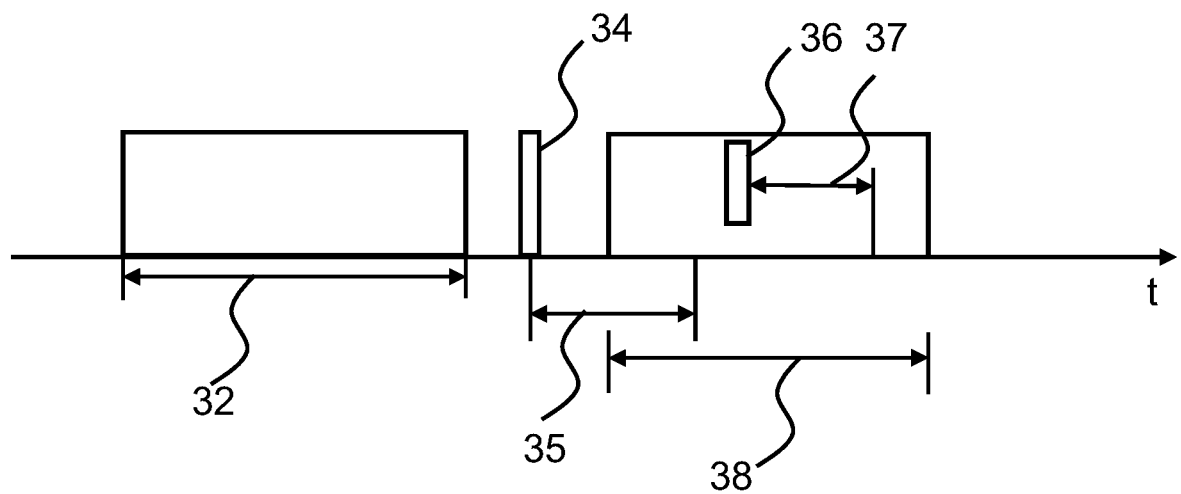
FIG. 3 is a schematic diagram illustrating a legacy sidelink sensing for transmission.

FIG. 3 is a schematic diagram illustrating a legacy sidelink sensing for transmission over time using Mode 2. When traffic arrives (e.g. from application layer or upper layers) at a wireless device (such as UE), the wireless device (such as UE) needs to autonomously select resources 36, 37 for its control channel, (e.g. PSCCH) and its shared (data) channel, (e.g. PSSCH) and reserve some resources (for example, reserving a specific frequency band for certain period of time 38) for potential re-transmission. In order not to interfere with ongoing sidelink transmissions, the resource selection and reservation is done in two steps: a sensing procedure and a resource selection procedure as shown in FIG. 3.

Sensing procedure includes a time window 32 where the transmitting wireless device (such as UE) should find out candidate resources potentially available to be utilized for side-link transmissions. The candidate resources may include resources unoccupied, and resources occupied by ongoing sidelink transmissions but with an acceptable interference level to the transmitting wireless device (such as UE). For this, the transmitting wireless device (such as UE) may measure the reference signals (Demodulation Reference Signals, DMRS) received power (Reference Signal Received Power, RSRP) of all the considered subchannels. When either the RSRP on these subchannels does not exceed an example threshold (e.g. a value of the example threshold is determined by the priority of the transport block, TB, transmission), or a subchannel is not occupied by other side-link transmissions, the subchannel is regarded as a candidate resource in the following selection window; otherwise, a subchannel is not a candidate resource.

To measure the RSRP, a transmitting wireless device (such as UE) needs to know the resources of the PSSCH or alternatively the PSCCH launched by other wireless devices (such as UEs). The transmitting wireless device may detect the 1st-stage SCI launched by other wireless devices (such as UEs). In the 1st-stage, SCI mainly carries the information regarding the PSSCH resources and the information for decoding the 2nd-stage SCI (e.g., time-frequency resources of PSSCH/PSFCH, the priority of this TB transmission, etc.) and is decodable by any wireless device (such as UE) for channel sensing purposes. In other words, no wireless device (such as UE) identifier, ID, is included in the $1^{st}$-stage SCI.

After identifying candidate resources at 34 based on the monitored resources during 32, a transmitting wireless device (such as UE) randomizes the selection of candidate resources to launch transmission of PSCCH, PSSCH, and feedback reception of physical sidelink feedback channel, PSFCH, during the selection window 38. When a transmitting WD begins launching the PSCCH, PSSCH and PSFCH, the transmitting WD may continue performing resource sensing in period 35. If the wireless device (such as UE) finds that there are other sidelink transmissions with a higher priority occupying the reserved resources, this wireless device (such as UE) triggers the resource re-selection.

Figure 4:
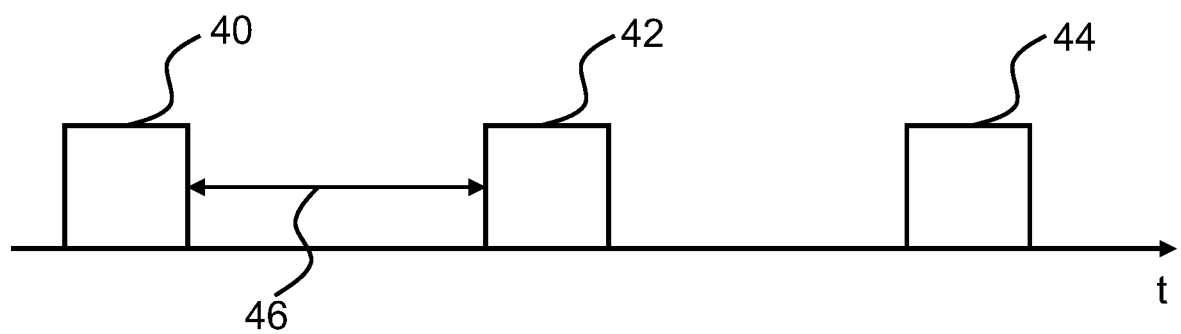
FIG. 4 is a schematic diagram illustrating sidelink transmission with DRX.

FIG. 4 is a schematic diagram illustrating sidelink transmission with DRX over time. In Release 16 NR, sidelink is designed based on the assumption of the WD "always-on" when wireless device (such as UE) operates sidelink. In other words, no discontinuous reception (DRX) exist or is defined. An approach in sidelink Rel-16 to reduce power consumption is to define an area where the sidelink configuration is valid by signaling a SideLink Zone Configuration, SL-ZoneConfig. Outside of this area the sidelink cannot be used.

It may be envisaged to include for e.g. NR a sidelink DRX mode for power limited wireless devices (such as UEs). In Sidelink DRX, wireless devices (such as UEs) belonging to the same group, or being in proximity, may be using the same DRX cycle, as illustrated FIG. 4, e.g. for groupcast or broadcast. FIG. 4 illustrates DRX active periods 40, 42, 44 for a group with a period 46 where no sidelink transmission takes place. A sensing procedure in advance of the DRX cycle in the envisaged approach leads to a limited sensing result in that no WD belonging to this group transmits data in advance of the DRX period because a sensing period in advance of the DRX period 42 falls in an inactive period 46 of DRX where no transmission is allowed for this group.

It may be envisaged to perform the sensing procedure during the DRX cycles but this in return leads to a longer active/on period in a DRX cycle since the sensing procedure includes a random procedure and thereby results in a higher power consumption at receiving wireless devices (such as UEs).

It is to be noted that with no sensing procedure at all, a risk of collision may be increased when several wireless devices (such as UEs), using the same DRX to be able to communicate between each other in the group, want to transmit in the same TxPool. With no sensing mechanism, all wireless devices (such as UEs) of the group are likely to start transmission at the same time.

The existing and envisaged sensing approaches are power consuming, requiring the WD to monitor and receive during a relatively long period. The disclosed technique addresses the above challenges and proposes a sensing and resource allocation mechanism applicable to Mode 2.

Figure 5A:
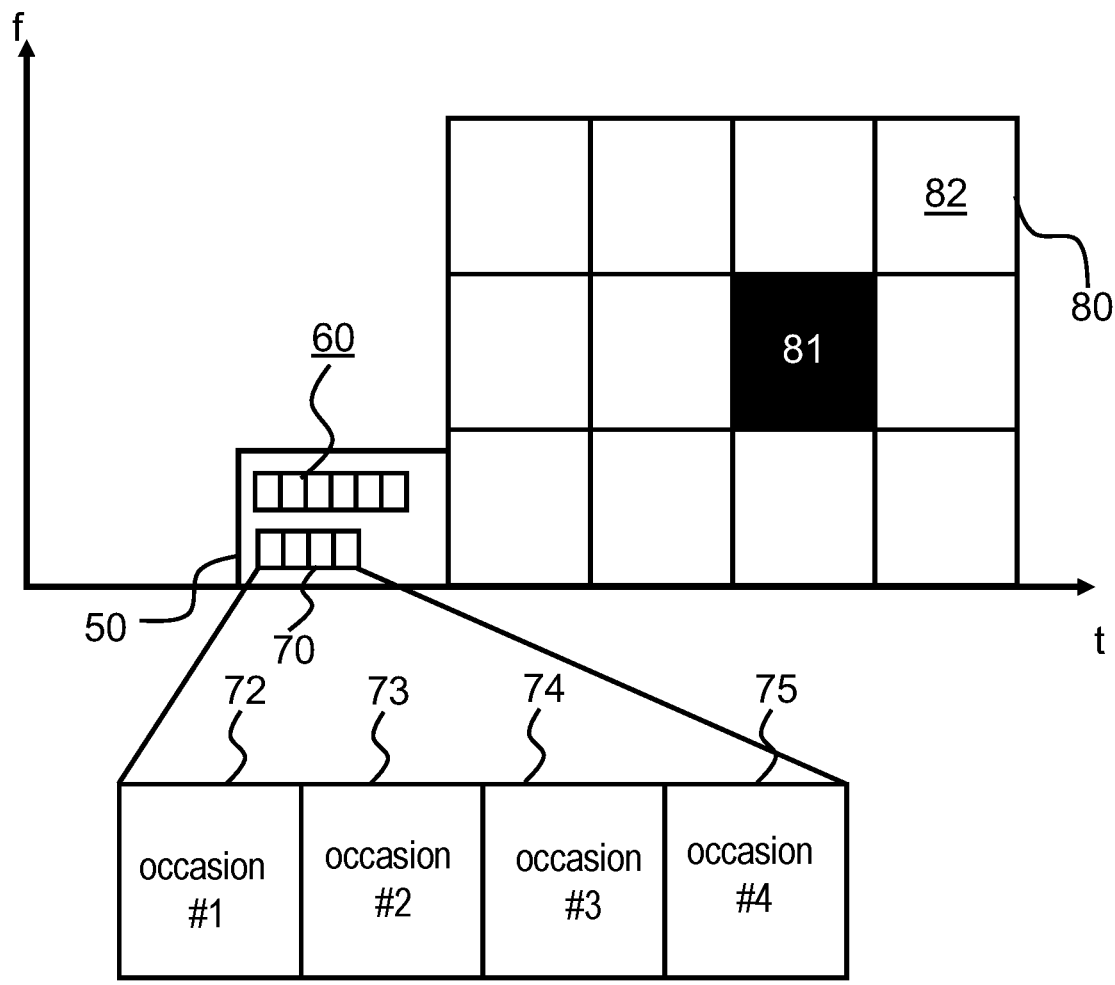
FIG. 5A is a schematic time-frequency diagram illustrating an example transmission resource pool and an example resource reservation pool according to this disclosure.

FIG. 5A is a schematic time-frequency diagram illustrating a transmission resource pool 80 and a resource reservation pool 50 according to this disclosure.

A TxPool may comprise a plurality of transmission resources that can be configured. In FIG. 5A, a portion of TxPool 80, such Tx resource 81, 82 is associated with the resource reservation pool.

A resource reservation pool disclosed herein may be seen a resource pool only used by a WD for sensing prior to transmission (such as prior to DRX active time duration, such as prior to DRX active time). A resource reservation pool disclosed herein may be seen a pool of resources used for reserving resources and detecting collisions prior to the actual transmissions. Receiving WDs do not need to monitor occasions of the resource reservation pool. The resource reservation pool may be seen as an allocation pool. The resource reservation pool is configured to allow a decrease of the risk of collision, also with DRX/DTX. A DRX cycle includes a DRX active time where a receiving WD can receive and a DRX inactive time where a receiving WD cannot receive. The active time may be seen as an active part and/or an active period of the DRX cycle. The inactive time may be seen as an inactive part and/or an inactive period of the DRX cycle. A DTX cycle includes a DTX active time where a transmitting WD can receive and a DTX inactive time where a transmitting WD cannot receive. The active time may be seen as an active part and/or an active period of the DTX cycle. The inactive time may be seen as an inactive part and/or an inactive period of the DTX cycle.

The disclosed resource reservation pool comprises, in order to decrease risk of collision, a plurality of occasions where a WD can transmit its request to allocate the corresponding transmission resources of TxPool for transmission of PSCCH and PSSCH. A resource reservation pool comprises one or more resource reservation blocks. A resource reservation block may be seen as a block of reserved resources for sensing before sidelink transmission. A resource reservation block may be seen as a specific block (comprising one or more resources) in the resource reservation pool that can be used to reserve a certain transmission resource in the transmission pool and also to detect collisions in the certain transmission resource. A resource reservation block may be distributed in time, or comprises subsequent resources in time and/or frequency. For example, a resource reservation block may comprise resources to be used for reservation of a transmission resource. For example, a resource reservation block may be seen as a reservation resource (including multiple transmission resource reservation occasions disclosed herein.

A resource reservation block comprises one or more occasions. The term "occasion" may be seen as a reservation occasion, such as an occasion to reserve, evaluate and/or sense a resource for transmission. The occasion disclosed herein may be seen as a reservation resource, such as in frequency and/or time. An occasion may also be seen as associated with a transmission resource of the TxPool. An occasion may also be seen as an occasion in time and/or frequency, e.g. each occasion is a fraction/subpart of the reservation block. Occasions may be distributed in time and/or frequency.

Stated differently, the resource reservation pool may comprise separate resource reservation blocks associated with individual transmission resources and each resource reservation block comprises several occasions pointing to the same transmission resource of the TxPool.

The resource reservation pool, RRP 50 is in advance or prior to the transmission resource pool 80. The TxPool 80 comprises a transmission resource 81, and another transmission resource 82. The RRP 60 is associated with or points to transmission resource 82 of transmission pool 80.

The resource reservation pool, RRP 50 includes a first resource reservation block 70 of occasions and optionally a second resource reservation block 60 of occasions. The RRP 50 is associated with or points to transmission resource 81 of transmission pool 80.

The first resource reservation block 70 of occasions comprises a first occasion 72 illustrated as occasion #1, a second occasion 73 illustrated as occasion #2, a third occasion 74 illustrated as occasion #3, and a fourth occasion 75 illustrated as occasion #4.

Figure 5B:
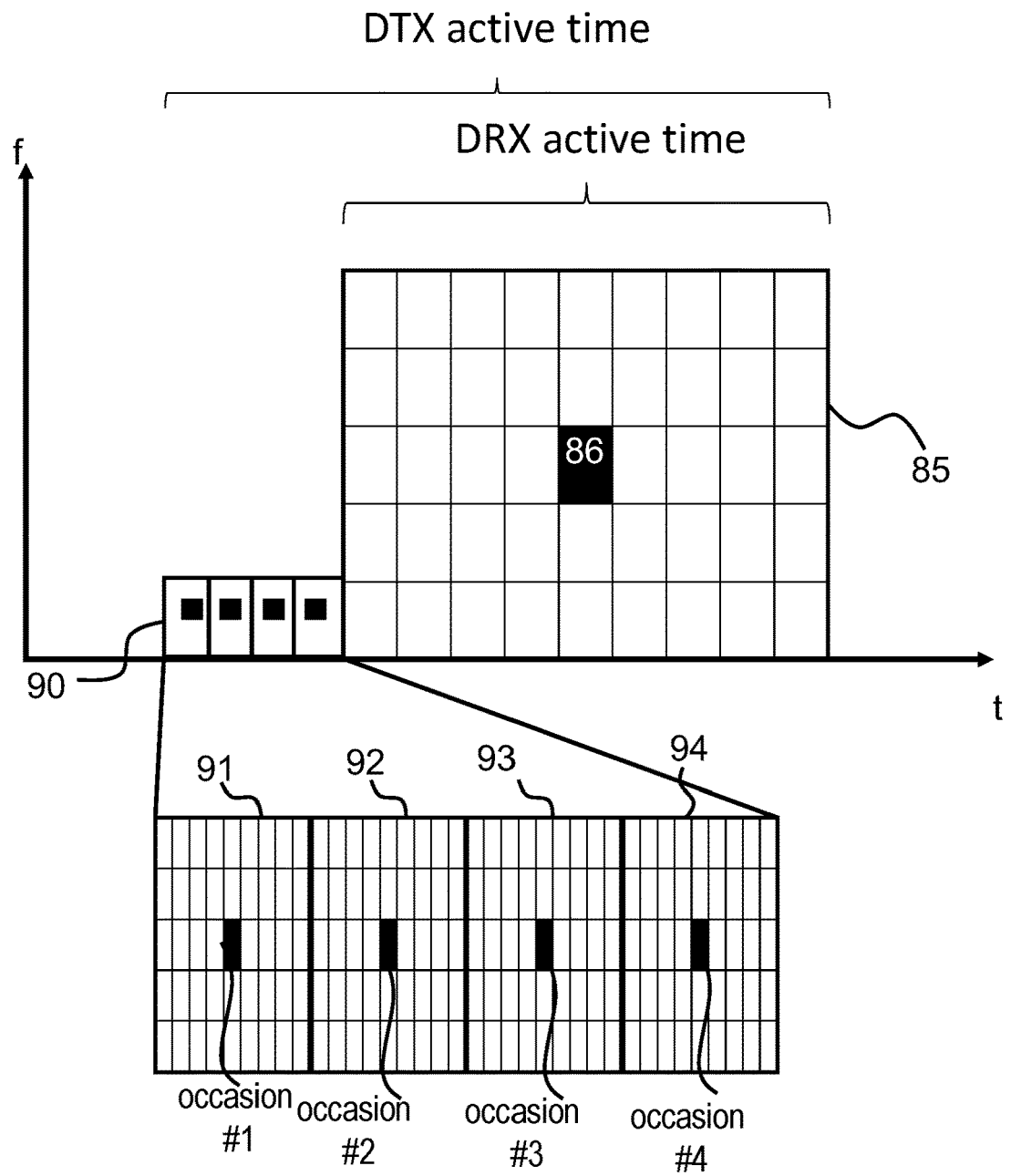
FIG. 5B is a schematic time-frequency diagram illustrating an example transmission resource pool and an example resource reservation pool according to this disclosure.

FIG. 5B is a schematic time-frequency diagram illustrating an example transmission resource pool 85 and an example resource reservation pool, RRP 90 according to this disclosure. The resource reservation pool 90 is in advance or prior to the transmission resource pool 85.

The TxPool 85 comprises a transmission resource 86, and other transmission resources. TxPool may comprise a plurality of transmission resources that can be configured. The RRP 90 is associated with transmission pool 85.

The resource reservation pool, RRP 90 includes a plurality of resource reservation blocks, such as a first resource reservation block 91 comprising a first occasion illustrated as occasion #1 in full black cell, a second resource reservation block 92 comprising a second occasion illustrated as occasion #2 in full black cell, a third resource reservation block 93 comprising a third occasion illustrated as occasion #3 in full black cell, and a fourth resource reservation block 94 comprising a fourth occasion illustrated as occasion #4 in full black cell. The resource reservation blocks 91, 92, 93, 94 are each associated with the transmission resource 86.

The other occasions illustrated by empty cells in a grid manner are associated with other Tx resources of TxPool 85 than Tx resource 86.

FIGS. 5A-5B illustrate example relations between a resource reservation pool and a transmission resource pool.

According to examples of this disclosure, an occasion of the resource reservation block may be allocated within a short period in advance of the TxPool, for sensing and resource allocation when the WD is configured with Mode 2.

As shown in FIG. 5B, any WD which wants to transmit data during the TxPool used during discontinuous reception and/or discontinuous transmission (DRX/DTX) can transmit a resource reservation signal (such as a sequence) in an occasion of the resource reservation pool. For example, as shown in FIG. 5B, any WD which wants to transmit data during the TxPool when configured with DRX and/or DTX can transmit a resource reservation signal (such as a sequence) in an occasion of the resource reservation pool. For example, as illustrated in FIG. 5B with the DTX active time and DRX active time, DTX of a transmitting WD starts before DRX of a receiving WD, in order to make the resource reservation. For example, the transmission of resource reservation signal is considered a part of DTX active time. For example, the transmission of resource reservation signal is performed prior to the DRX active time of the receiving wireless device. For example, the transmission of resource reservation signal is performed prior to the sidelink transmission.

The resource reservation signal can be seen as a signal for reserving a resource in the Tx Pool for transmission in order to minimize a risk of collision. Transmission of the resource reservation signal is performed before the actual sidelink transmission over the transmission resource of Tx pool.

The resource reservation signal shows where the WD wants or intends to allocate the corresponding PSCCH/PSSCH in TxPool as well as the associated resources for acknowledgement reception. The resource reservation pool may have a resource range (time duration and frequency range of allocation pool) that is smaller than the TxPool.

A WD transmitting in a resource reservation block of the resource reservation pool may not know if another WD is transmitting in the same occasion. Therefore, a resource reservation block comprises several occasions in a resource reservation pool for each transmission resource of PSCCH/PSSCH during the TxPool as well as the associated resources for acknowledgement reception, as illustrated in FIGS. 5A-B. For example, a WD wanting to transmit in a randomly selected resource reservation block (or sets of resource blocks) in the TxPool transmits a resource reservation signal (such as an allocation request) in a random selection of the corresponding occasion in the resource reservation pool.

Figure 6:
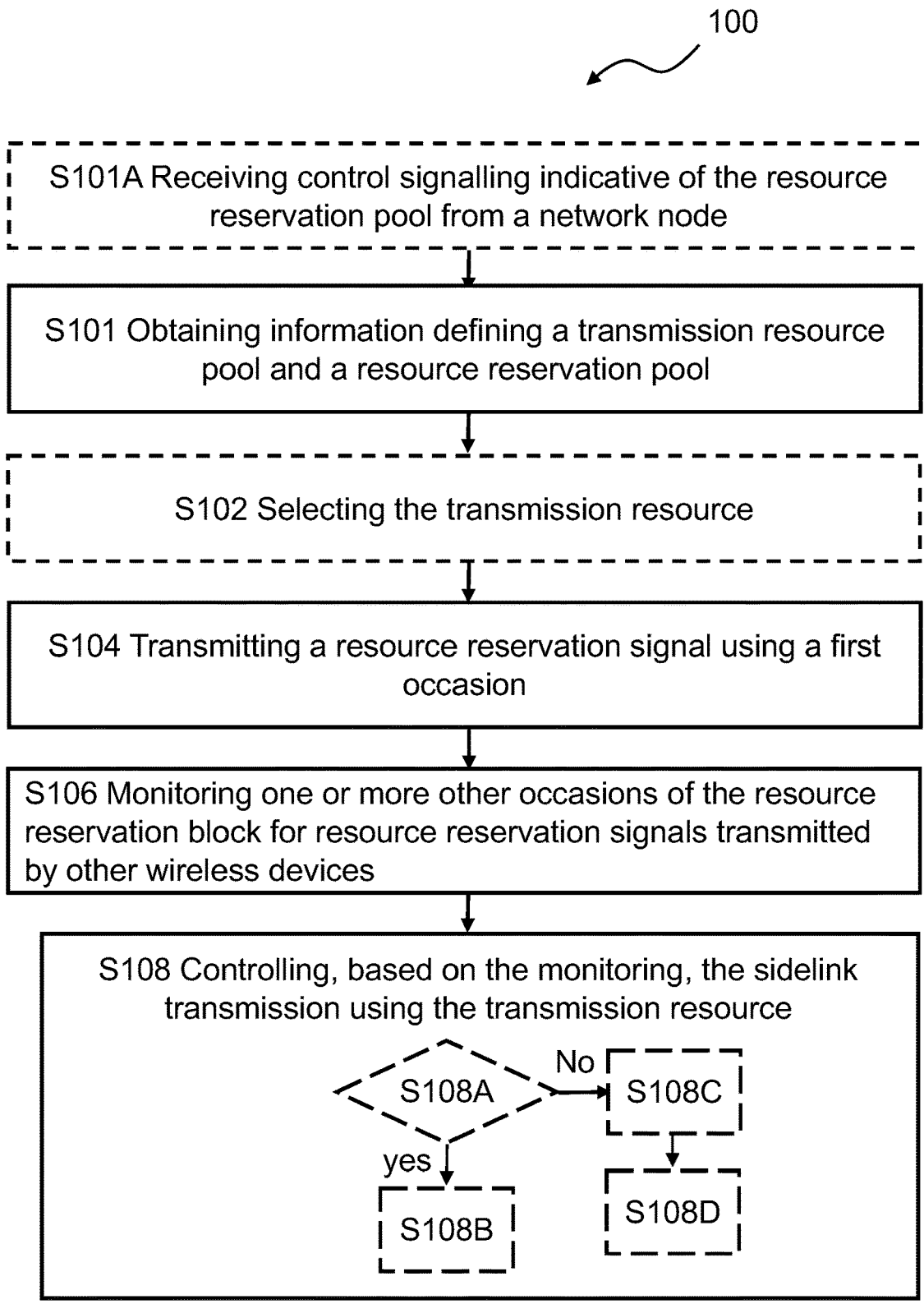
FIG. 6 is a flow-chart illustrating an example method, performed by a wireless device, for resource reservation of a contention-based sidelink transmission according to this disclosure.
Figure 7:
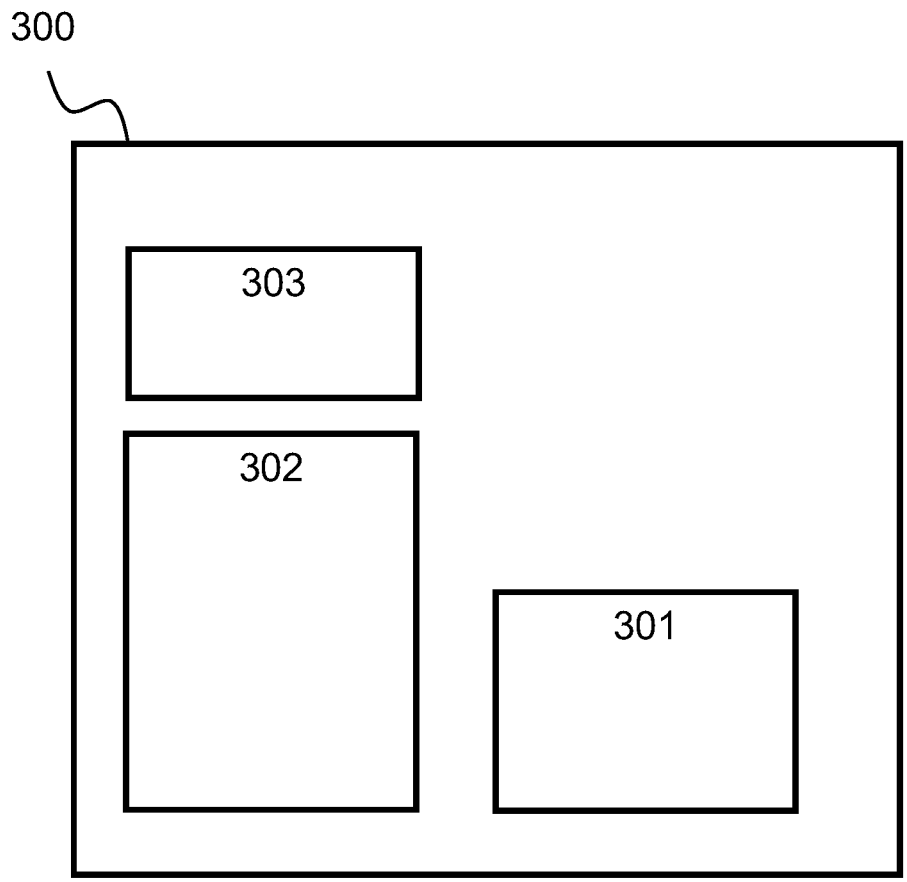
FIG. 7 is a block diagram illustrating an example wireless device according to this disclosure.

FIG. 6 is a flowchart illustrating an example method 100, performed by a wireless device (such as the wireless device disclosed herein, such as wireless device 300, 300A, 300B of FIG. 1 and FIG. 7, such as a wireless transmitter device, such as a wireless device intending to transmit data), for resource reservation of a contention-based sidelink transmission according to the disclosure. The method 100 may be seen as a method for resource reservation of a contention-based sidelink transmission according to a DRX cycle. In one or more example methods, the wireless device may act as a transmitter node. In one or more example methods, the wireless device may act as a receiver node.

The method 100 comprises obtaining S101 information defining a transmission resource pool and a resource reservation pool comprising one or more resource reservation blocks associated with respective transmission resources in the transmission resource pool. For example, obtaining S101 may comprise receiving and/or retrieving (such as from a memory of the wireless device) information defining the transmission resource pool and the resource reservation pool associated with respective transmission resources in the transmission resource pool. The transmission resource pool can be aligned with the DRX active time of a receiving wireless device, for example as illustrated in FIG. 5B. The resource reservation pool can be arranged (e.g. scheduled) prior to the DRX active time.

In one or more example methods, the resource reservation block may be seen as a reservation resource. In one or more example methods, each of the one or more resource reservation blocks comprises a plurality of occasions. For example, the resource reservation blocks may comprise a first occasion, and optionally a second occasion, and optionally a third occasion. For example, occasions of a resource reservation block are seen as separate resources in time and/or frequency. For example, the first occasion is separate, in time and/or in frequency from any other occasions of the same resource bock, such as separate from the second occasions and/or from the third occasion. For example, a resource reservation block may be seen as pointing to (i.e. referring to or associated with) a specific transmission resource, as illustrated in FIGS. 5A-5B. In other words, one resource reservation block can be used to reserve a certain corresponding transmission resource of the transmission resource block. For example, a resource reservation block and/or its occasions enable a reservation of an associated transmission resource. The association of the resource reservation block and the transmission resource is illustrated in FIGS. 5A-5B. For example, the occasions of the same resource reservation block may be seen as pointing to (e.g. associated with, e.g. enabling reservation of) that specific transmission resource. In one or more example methods, information indicative of the resource reservation pool is pre-configured in the wireless device.

In one or more example methods, the method 100 comprises selecting S102 the transmission resource in the transmission resource pool for sidelink transmission by the wireless device. For example, the wireless device intending to transmit may select randomly (e.g. pseudo-randomly) the transmission resource in the transmission resource pool. The selection of the Tx resource may be performed in other ways than randomly, such as following a deterministic method.

The method 100 comprises transmitting S104 a resource reservation signal using a first occasion of a resource reservation block associated with a transmission resource selected (such as that has been selected) by the wireless device for sidelink transmission. The first occasion is any occasion of a resource reservation block pointing to the transmission resource that has been selected by the wireless device for sidelink transmission (denoted first occasion, e.g. for readability), such as an occasion randomly selected by the wireless device. For example, the WD may randomly (e.g. pseudo-randomly) select as the first occasion any occasions of the resource reservation block pointing to the transmission resource. The transmission S104 may serve as an indication to other WDs that the WD intends to transmit using the selected transmission resource. The resource reservation signal may be indicative of or may comprise one or more of: an allocation request, a pilot signal, and a sequence. For example, the wireless device wanting to transmit in a randomly selected Tx resource of the TxPool transmits the resource reservation signal in a random selection of the corresponding occasion in the resource reservation block of the resource reservation pool. In one or more example methods, the transmitting S104 is performed prior to the sidelink transmission. The selection of the occasion for transmission S104 may be performed in other ways than randomly, e.g. using a deterministic method.

The method 100 comprises monitoring S106 one or more other occasions of the resource reservation block for resource reservation signals transmitted by other wireless devices aiming at reserving the same transmission resource. For example, the monitoring S106 may allow the WD to check if there are other WDs that intend to use the same Tx resource. In other words, the WD may check by monitoring S106, if there is a conflict and avoid a possible collision. In one or more example methods, the one or more other occasions are different from the first occasion. In other words, the wireless device senses or evaluates the availability of the transmission resource selected by listening to one or more other occasions of the resource reservation block (such as of the same resource reservation block used in S104) for resource reservation signals transmitted by other wireless devices aiming at reserving the same transmission resource. Stated differently, by monitoring the other occasion(s) of the same resource reservation block, the wireless device can identify if the transmission resource selected is available or not. For example, in FIGS. 5A-5B, the first occasion for transmission of the resource reservation signal can be occasion #1, and the other occasions monitored in S106 are occasion #2, occasion #3 and/or occasion #4. For example, in FIGS. 5A-5B, the first occasion for transmission of the resource reservation signal can be occasion #3, and the other occasions monitored in S106 are occasion #1, occasion #2 and/or occasion #4. It is to be noted that the occasion selected as the occasion for transmission S104 (referred to as the first occasion) may be randomly selected, e.g. prior to the transmission S104 of the resource reservation signal.

The method 100 comprises controlling S108, based on the monitoring, the sidelink transmission using the transmission resource. In other words, based on whether the monitoring S106 reveals a conflict indicating that other WDs intend to use the same Tx resource, the WD determines whether to transmit using the selected Tx resource or not. In other words, based on whether the monitoring S106 reveals that the selected Tx resource is free or occupied, the WD may determine to transmit or not using the selected Tx resource. In one or more example methods, the controlling S108 comprises determining S108A, based on the monitoring, if the same transmission resource is free from transmissions of resource reservation signals by the other wireless devices. In other words, the wireless device may determine based on the monitoring S106 if the transmission resource selected by the wireless device (which is the same transmission resource monitored in S106) is available. The monitoring S106 may comprise measuring the signal strength of a signal (such as a sequence) communicated over the transmission resource selected followed by comparing the signal strength to a threshold above which a conflict is detected. The monitoring S106 may comprise detecting a signal pattern.

In one or more example methods, the controlling S108 comprises upon determining that the same transmission resource is free, performing S108B the sidelink transmission using the selected transmission resource, optionally according to the DTX cycle and/or DRX cycle of the receiver. Stated differently, the wireless device may perform the sidelink transmission using the selected transmission resource when the monitoring S106 shows (i.e. reveals or indicates) that the transmission resource selected by the wireless device (which is the same transmission resource monitored in S106) is available. For example, when no other transmission in any of the one or more other occasions are detected, the wireless device is allowed to transmit.

In one or more example methods, the controlling S108 comprises upon determining that the same transmission resource is not free (e.g. not available), applying S108C conflict resolution rules. Stated differently, the wireless device may apply conflict resolution rules when the monitoring S106 shows that the transmission resource selected by the wireless device (which is the same transmission resource monitored in S106) is not available. For example, when a transmission in any of the one or more other occasions is detected, the wireless device may proceed to apply conflict resolution rules. For example, when there is a conflict between several WDs, meaning that the multiple WDs are transmitting allocation requests in the one or more other occasions associated with the same transmission resource, there are rules to resolve the conflict. For example, a rule may be that the WD transmitting for the first time in an (e.g. randomly selected) occasion of the several occasions in the resource reservation pool, used to allocate a specific transmission resource (or set of transmission resource blocks, RB), is selected to transmit in that specific transmission resource. For example, when the monitoring S106 shows that the transmission resource selected by the wireless device (which is the same transmission resource monitored in S106) is not free, the WD may apply a conflict resolution that requests the WD to wait to next TxPool or request the WD to attempt another Tx resource. Stated differently, when the Tx resource selected is not free, the WD may re-start and select a new transmission resource.

In one or more example methods, the resource reservation signal comprises a priority parameter. In one or more example methods, the conflict resolution rules are, in part, based on the priority parameter, allowing the sidelink transmission using the selected transmission resource according to a priority order indicated in the priority parameter. For example, a conflict resolution rule may comprise that the transmission with a priority parameter indicated the highest priority order is selected for transmission. For example, the priority parameter may be sent within an allocation request or specific occasions of the allocation request may be used only by prioritized data. For example, when the WD is planning to request a certain Tx resource and WD detects that another WD (with a priority parameter indicating an equal or higher priority) already have allocated the same Tx resources, the WD may wait to next TxPool, or it may request another TX resource which is not allocated. Stated differently, when the Tx resource selected is not free, the WD may re-start and select a new transmission resource.

In one or more example methods, the method 100 comprises upon determining that the same transmission resource is not free, transmitting data and monitoring S108D an available part of a reception resource pool for data reception including an acknowledgment of the sidelink transmission. For example, when the same transmission resource is not free, the WD may monitor for data in the available part of the RxPool until an acknowledgment is received. For example, the UE is allowed to transmit in a certain resource in the TxPool, which is part of the RxPool. When transmitting in the TxPool, the UE may not be able to monitor RxPool during the time it is transmitting but shall still monitor the rest of the RxPool which the UE is able to monitor.

In one or more example methods, each occasion of the resource reservation blocks is associated with a respective transmission resource of the transmission resource pool.

In one or more example methods, the sidelink transmission comprises a transmission over a Physical Sidelink Control Channel, PSCCH, and/or over a Physical Sidelink Shared Channel, PSSCH.

In one or more example methods, the sidelink transmission is performed according to a Discontinuous Transmission, DTX, cycle of the wireless device and/or a Discontinuous Reception, DRX, cycle of the wireless device. For example, the sidelink transmission is performed according to a DTX of the wireless device being transmitter. For the receiving WD to receive the data from the transmitting WDs, the active period of DRX of the receiver need to overlap with the active period of the DTX of the transmitter WD.

In one or more example methods, the monitoring S106 and/or the transmitting S104 of the resource reservation signal is performed in an inactive part of the DRX cycle, e.g. used by WDs only receiving and optionally an active part of the DTX cycle of the transmitting WD. In one or more example methods, the monitoring S106 of the resource reservation signal is performed in an inactive part of the DRX cycle.

In one or more example methods, the transmitting S104 of the resource reservation signal is performed in an inactive part of the DRX cycle.

In one or more example methods, the monitoring S106 and the transmitting S104 of the resource reservation signal is performed in an inactive part of the DRX cycle.

In one or more example methods, the method 100 comprises receiving S101A control signalling indicative of the resource reservation pool from a network node, such as control signalling indicative of the information defining the TxPool and the RRP associated with respective transmission resources in the transmission resource pool. The control signalling may comprise the information obtained in S101.

In one or more example methods, the resource reservation pool is smaller than the transmission resource pool.

In one or more example methods, a resource reservation block in the resource reservation pool is associated with a transmission resource of the transmission resource pool, e.g. to avoid collisions. For example, more than one occasion of the resource reservation block is associated with the same Tx resource of the transmission resource pool. For example, the resource reservation pool maps to the transmission pool and one resource reservation block in the resource reservation pool maps to the Tx resource of the TxPool.

FIG. 7 shows a block diagram of an example wireless device 300 according to the disclosure. The wireless device 300 comprises memory circuitry 301, processor circuitry 302, and a wireless interface 303. The wireless device 300 may be configured to perform any of the methods disclosed herein and in FIG. 6. In other words, the wireless device 300 may be configured for resource reservation of a contention-based sidelink transmission, e.g. according to a DRX cycle.

The wireless device 300 is configured to communicate (such as via the wireless interface 303) with other wireless devices, such as the WDs 300A, 300B (shown in FIG. 1), using a wireless communication system. Optionally, the wireless device 300 is configured to communicate a network node, such as the network node 400.

The wireless device 300 is configured to obtain (such as using the processor circuitry 302 and/or the wireless interface 303) information defining a transmission resource pool and a resource reservation pool comprising one or more resource reservation blocks associated with respective transmission resources in the transmission resource pool. The one or more resource reservation blocks comprise, each, a plurality of occasions.

The wireless device 300 is configured to transmit (such as via the wireless interface 303) a resource reservation signal using a first occasion of a resource reservation block associated with a transmission resource selected by the wireless device 300 for sidelink transmission.

The wireless device 300 is configured to monitor (such as using the processor circuitry 302 and/or the wireless interface 303) one or more other occasions of the resource reservation block for resource reservation signals transmitted by other wireless devices (such as the other wireless devices 300A and/or 300B shown in FIG. 1) aiming at reserving the same transmission resource. The one or more other occasions are different from the first occasion. In other words, the one or more other occasions are not the occasion (denoted first occasion) used for transmission of the resource reservation signal by wireless device 300

The wireless device 300 is configured to control (such as using the processor circuitry 302), based on the monitoring, the sidelink transmission using the transmission resource.

In one or more example wireless devices, the wireless device 300 is configured to determine (such as using the processor circuitry 302), based on the monitoring, if the same transmission resource is free from transmissions of resource reservation signals by the other wireless devices (such as the other wireless devices 300A and/or 300B shown in FIG. 1), upon determining that the same transmission resource is free, perform the sidelink transmission using the selected transmission resource.

In one or more example wireless devices, the wireless device 300 is configured to upon determining that the same transmission resource is not free, apply (such as using the processor circuitry 302) conflict resolution rules.

In one or more example wireless devices, the wireless device 300 is configured to determine (such as using the processor circuitry 302) that the same transmission resource is not free, monitor an available part of a reception resource pool for data reception including an acknowledgment of the sidelink transmission.

In one or more example wireless devices, the wireless device 300 is configured to receive (such as via the wireless interface 303) control signalling indicative of the resource reservation pool from a network node.

In one or more example wireless devices, the wireless device 300 is configured to select the transmission resource in the transmission resource pool for sidelink transmission by the wireless device. In one or more example wireless devices, the transmission resource is associated with a resource reservation block in the resource reservation pool.

The wireless interface 303 is configured for wireless communications via a wireless communication system, such as a 3GPP system, such as a 3GPP system supporting one or more of: New Radio, NR, V2X, LTE. It may be envisaged that the present disclosure may be used in Narrow-band IoT, NB-IoT, and Long Term Evolution-enhanced Machine Type Communication, LTE-M.

The wireless device 300 is optionally configured to perform any of the operations disclosed in FIG. 6 (such as any one or more of S101A, S102, S108A, S108B, S108C, S108D). The operations of the wireless device 300 may be embodied in the form of executable logic routines (for example, lines of code, software programs, etc.) that are stored on a non-transitory computer readable medium (for example, memory circuitry 301) and are executed by processor circuitry 302.

Furthermore, the operations of the wireless device 300 may be considered a method that the wireless device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 7). Memory circuitry 301 is considered a non-transitory computer readable medium.

Memory circuitry 301 may be configured to store information such as information defining transmission resource pool and/or a resource reservation pool, priority parameters, and/or conflict resolution rules in a part of the memory.

Examples of methods and products (wireless device) according to the disclosure are set out in the following items:

Item 1. A method, performed by a wireless device, for resource reservation of a contention-based sidelink transmission, the method comprising:
- obtaining (S101) information defining a transmission resource pool and a resource reservation pool comprising one or more resource reservation blocks associated with respective transmission resources in the transmission resource pool, wherein the one or more resource reservation blocks comprise a plurality of occasions;
- transmitting (S104) a resource reservation signal using a first occasion of a resource reservation block associated with a transmission resource selected by the wireless device for sidelink transmission;
- monitoring (S106) one or more other occasions of the resource reservation block for resource reservation signals transmitted by other wireless devices aiming at reserving the same transmission resource, wherein the one or more other occasions are different from the first occasion; and
- controlling (S108), based on the monitoring, the sidelink transmission using the transmission resource.

Item 2. The method according to item 1, wherein the transmitting (S104) is performed prior to the sidelink transmission.

Item 3. The method according to any of the previous items, wherein the controlling (S108) comprises:
- determining (S108A), based on the monitoring, if the same transmission resource is free from transmissions of resource reservation signals by the other wireless devices;
- upon determining that the same transmission resource is free, performing (S108B) the sidelink transmission using the selected transmission resource.

Item 4. The method according to item 3, wherein the controlling (S108) comprises:
- upon determining that the same transmission resource is not free, applying (S108C) conflict resolution rules.

Item 5. The method according to any of the previous items, wherein the resource reservation signal comprises a priority parameter.

Item 6. The method according to any of items 4-5, wherein the conflict resolution rules are, in part, based on the priority parameter, allowing the sidelink transmission using the selected transmission resource according to a priority order indicated in the priority parameter.

Item 7. The method according to any of the previous items, wherein each occasion of the resource reservation block is associated with a respective transmission resource of the transmission resource pool.

Item 8. The method according to any of the previous items, wherein the sidelink transmission comprises a transmission over a Physical Sidelink Control Channel, PSCCH, and/or over a Physical Sidelink Shared Channel, PSSCH.

Item 9. The method according to any of the previous items, wherein the sidelink transmission is performed according to a Discontinuous Transmission, DTX, cycle of the wireless device and/or a Discontinuous Reception, DRX, cycle of the wireless device.

Item 10. The method according to item 9, wherein the monitoring (S106) and/or the transmitting (S104) of the resource reservation signal is performed in an inactive part of the DRX cycle.

Item 11. The method according to any of the previous items, wherein information indicative of the resource reservation pool is pre-configured in the wireless device.

Item 12. The method according to any of the previous items, the method comprising receiving (S101A) control signalling indicative of the resource reservation pool from a network node.

Item 13. The method according to any of the previous items, wherein the resource reservation pool is smaller than the transmission resource pool.

Item 14. The method according to any of the previous items, the method comprising selecting (S102) the transmission resource in the transmission resource pool for sidelink transmission by the wireless device, wherein the transmission resource is associated with a resource reservation block in the resource reservation pool;

Item 15. A wireless device comprising memory circuitry, processor circuitry, and a wireless interface, wherein the wireless device is configured to perform any of the methods according to any of items 1-14.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-7 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a wireless device, for resource reservation of a contention-based sidelink transmission according to a Discontinuous Reception (DRX) cycle, the method comprising:
    obtaining information defining a transmission resource pool aligned with DRX active time of a receiving wireless device and a resource reservation pool arranged prior to the DRX active time comprising one or more resource reservation blocks associated with respective transmission resources in the transmission resource pool, wherein the one or more resource reservation blocks comprise a plurality of occasions;
    transmitting a resource reservation signal using a first occasion of a resource reservation block associated with a transmission resource selected by the wireless device for sidelink transmission;
    monitoring one or more other occasions of the resource reservation block for resource reservation signals transmitted by other wireless devices aiming at reserving the same transmission resource, wherein the one or more other occasions are different from the first occasion; and
    controlling, based on the monitoring, the sidelink transmission using the transmission resource;
    wherein the transmitting is performed prior to the sidelink transmission.

2. The method according to claim 1, wherein the resource reservation signal comprises a priority parameter.

3. The method according to claim 1, wherein the controlling comprises: upon determining that the same transmission resource is not free, applying conflict resolution rules, wherein the conflict resolution rules are, in part, based on a priority parameter, allowing the sidelink transmission using the selected transmission resource according to a priority order indicated in the priority parameter.

4. The method according to claim 1, wherein the controlling comprises:
    determining, based on the monitoring, if the same transmission resource is free from transmissions of resource reservation signals by the other wireless devices;
    upon determining that the same transmission resource is free, performing the sidelink transmission using the selected transmission resource.

5. The method according to claim 1, wherein the occasions of the resource reservation blocks are associated with transmission resources of the transmission resource pool.

6. The method according to claim 1, wherein the sidelink transmission comprises a transmission over a Physical Sidelink Control Channel (PSCCH), and/or over a Physical Sidelink Shared Channel (PSSCH).

7. The method according to claim 1, wherein the sidelink transmission is performed according to a Discontinuous Transmission (DTX) cycle of the wireless device and/or a Discontinuous Reception (DRX) cycle of the wireless device.

8. The method according to claim 7, wherein the monitoring and/or the transmitting of the resource reservation signal is performed in an inactive part of the DRX cycle.

9. The method according to claim 1, wherein information indicative of the resource reservation pool is pre-configured in the wireless device.

10. The method according to claim 1, the method comprising receiving control signalling indicative of the resource reservation pool from a network node.

11. The method according to claim 1, wherein the resource reservation pool is smaller than the transmission resource pool.

12. The method according to claim 1, the method comprising selecting
    the transmission resource in the transmission resource pool for sidelink transmission by the wireless device, wherein the transmission resource is associated with a resource reservation block in the resource reservation pool.

13. A wireless device comprising memory circuitry, processor circuitry, and a wireless interface, wherein the wireless device is configured to perform the method of claim 1.

* * * * *